US010528630B2

(12) United States Patent
Ayres et al.

(10) Patent No.: US 10,528,630 B2
(45) Date of Patent: Jan. 7, 2020

(54) MANAGING THE BACKLOG OF UNDELIVERED PUBLICATIONS FOR DURABLE SUBSCRIPTIONS

(75) Inventors: Malcolm David Ayres, Romsey (GB); Martin Phillips, Chandlers Ford (GB); Adrian James Preston, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 914 days.

(21) Appl. No.: 12/651,139

(22) Filed: Dec. 31, 2009

(65) Prior Publication Data

US 2011/0161382 A1 Jun. 30, 2011

(51) Int. Cl.
*G06F 17/00* (2019.01)
*G06F 16/9535* (2019.01)

(52) U.S. Cl.
CPC ................................ *G06F 16/9535* (2019.01)

(58) Field of Classification Search
CPC .................................................. G06F 17/3089
USPC ................................................. 707/628, 821
See application file for complete search history.

(56) References Cited

U.S. PATENT DOCUMENTS 7,747,730 B1 * 6/2010 Harlow ................ H04L 41/048 709/224
7,945,631 B2 * 5/2011 Chkodrov .............. H04L 51/00 709/206
2006/0069587 A1 3/2006 Banks et al.
2006/0230263 A1 * 10/2006 Bhogal .............. H04L 67/1095 713/100
2009/0290503 A1 * 11/2009 Preston .................. H04L 67/14 370/252
2011/0040895 A1 * 2/2011 Griffin ............... H04L 67/1095 709/248
2011/0099232 A1 * 4/2011 Gupta .............. H04L 29/08729 709/206

OTHER PUBLICATIONS

Apache ActiveMQ, "how do durable queues and topics work?" Published May 24, 2005, available at http://activemq.apache.org/how-do-durable-queues-and-topics-work.html.*

(Continued)

*Primary Examiner* — Alexandria Y Bromell
(74) *Attorney, Agent, or Firm* — Steven M. Greenberg, Esq.; Shutts & Bowen LLP

(57) ABSTRACT

In managing the backlog of undelivered publications for durable subscriptions, a maximum quantity of publications stored in connection with a durable subscription to publications of a particular topic can be established on behalf of a particular subscribing end user. A new publication published for the particular topic subscribed to by the end user can be received and it can be determined if storing the new publication in connection with the durable subscription causes a quantity of publications stored in connection with the durable subscription to exceed the maximum quantity. The new publication can be stored in connection with the durable subscription; however, the oldest publication stored in connection with the durable subscription can be removed when it is determined that storing the new publication in connection with the durable subscription causes a quantity of publications stored in connection with the durable subscription to exceed the maximum quantity.

8 Claims, 1 Drawing Sheet

(56) References Cited

OTHER PUBLICATIONS

Apache ActiveMW, "How do durable queues and topics work?" Published May 24, 2005, available at http://activemq.apache.org/how-do-durable-queues-and-topics-work.html (Year: 2005).*

Gaddah, Abdulbaset et al., "A pro-active mobility management scheme for pub/sub systems using neighborhood graph," IWCMC ' 09: Proceedings of the 2009 International Conference on Wireless Communications and Mobile Computing: Connecting the World Wirelessly. (Year: 2009).*

Sun Microsystems; "the J2EE 1.4; Creating Robust JMS Applications"; http://java.sun.com/j2ee/1.4/docs/tutorial/doc/JMS6.html; last visited on Dec. 2, 2009.

IBM Corporation; "WebSphere Application Server Express, Version 6.0, Using Durable Subscriptions"; Nov. 3, 2009; http://publib.boulder.ibm.com/infocenter/wasinfo/v6r0/index.jsp?topic=/com.ibm.websphere.pmc.express.doc/tasks/tjn0012_.html; last visited on Dec. 2, 2009.

* cited by examiner

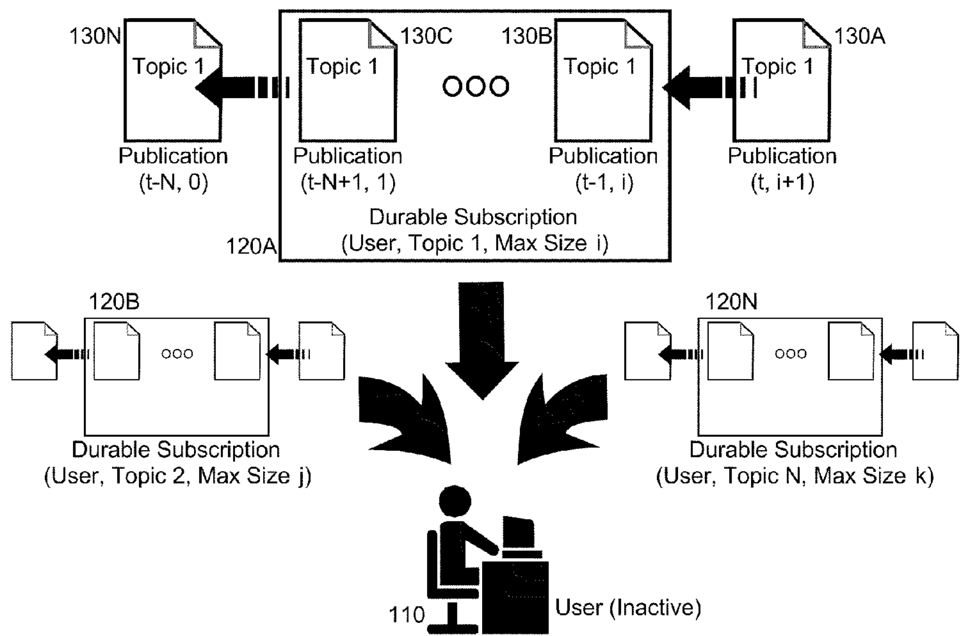
FIG. 1
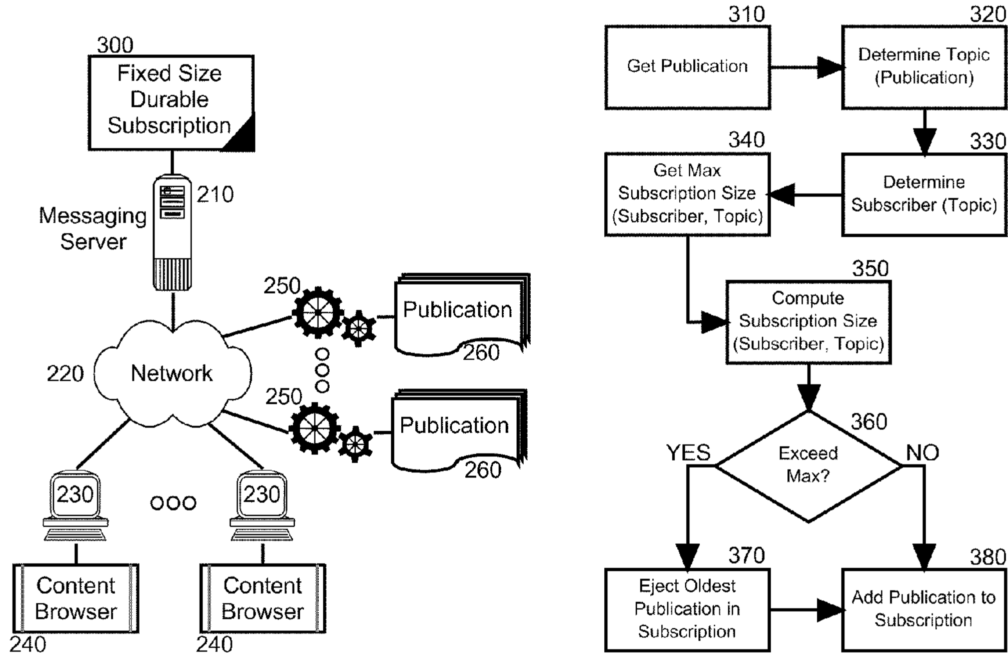
FIG. 2
FIG. 3

MANAGING THE BACKLOG OF UNDELIVERED PUBLICATIONS FOR DURABLE SUBSCRIPTIONS

BACKGROUND

The present invention relates to document publication in a publish and subscribe document distribution data processing system and more particularly to durable subscription management for a publish and subscribe document distribution data processing system.

Content distribution in the context of computing refers to the electronic distribution of content across a computer communications network. Traditional modes of distributing content require the indexing of available content in a form addressable by an end user to retrieve the content from over the network. The most popular mechanism for distributing content, of course, is the World Wide Web, hereinafter the "Web". Other mechanisms are favored for content distribution, as well, most notably, through the use of electronic messaging such as e-mail. In fact, mass distribution of promotional content often relies upon bulk e-mail rather than the passive posting of content on Web pages disposed about the Web. Venerable forms of content distribution also include discussion forums and shared document libraries providing hierarchically arranged threads of discussions.

Given the vast volume of content available and of interest to individuals globally, aggregation technologies have evolved to provide the end user with the ability to subscribe to content of interest so as to have the content of interest pushed to the subscribing end user without requiring the end user to manually located and pull content of interest. The publish and subscribe paradigm, though effective, can become an overwhelmingly difficult management problem in that a large volume of content is continuously automatically delivered to the subscriber as the content becomes available. With the passage of enough time, the subscriber can become swamped with unviewed content and must filter the unviewed content to truly identify content of temporal relevance. Indeed, with enough passage of time, the process of sifting through delivered content under subscription can approach the inefficiency corresponding to the manual pulling of the content from the source of the content in the absence of the subscription.

To address the challenge of out-of-control delivery of subscribed content, durable subscriptions have become a popular mechanism used by content subscribers. In a durable subscription, content continues to be collected for a subscriber of the content during periods of inactivity of the subscriber such that when the subscriber becomes active, the content received during the period of inactivity remains accessible to the subscriber. In a durable subscription, however, only a maximum volume of content is permitted pending during a period of inactivity by the subscriber pending a review by the subscriber. Once the maximum volume has been reached for a subscribed topic of interest, subsequent content once published is ignored. Consequently, once the subscriber becomes active, the subscriber will not necessarily review the most temporally relevant content for a durably subscribed topic.

Other solutions exist to address the deficiency of durable subscriptions. Examples include the retained publications algorithm in which only the most recent content for a topic will be viewed by a subscriber once active. However, the retained publications algorithm does not permit the recently active subscriber to view any historical context of content posted for a subscribed topic. Yet other solutions include shared circular queues of content that store a fixed number of most recently published content for a subscribed topic for all viewers. Yet, in a shared circular queue, the removal or deletion of content by one subscribing viewer prevents other subscribing viewers from continuing to access the removed or deleted content.

BRIEF SUMMARY

In an embodiment of the invention, a method for managing the backlog of undelivered publications for durable subscriptions can include establishing a maximum quantity of publications stored in connection with a durable subscription to publications of a particular topic on behalf of a particular subscribing end user in a messaging system. The method also can include receiving in the messaging system a new publication published for the particular topic subscribed to by the end user.

Thereafter, it can be determined if storing the new publication in connection with the durable subscription causes a quantity of publications stored in connection with the durable subscription to exceed the maximum quantity. In either case, the new publication can be stored in connection with the durable subscription. However, the oldest publication stored in connection with the durable subscription can be removed when it is determined that storing the new publication in connection with the durable subscription causes a quantity of publications stored in connection with the durable subscription to exceed the maximum quantity.

In another embodiment of the invention, a messaging data processing system can be configured for managing the backlog of undelivered publications for durable subscriptions. The system can include a messaging server including processor and memory and configured for coupling to different content providers over a computer communications network. The system also can include a messaging system executing in the memory of the messaging server and configured to manage different durable subscriptions on behalf of correspondingly different subscribing end users accessing the messaging system. Finally, a first-in first-out fixed size durable subscription module can be coupled to the messaging system.

The module can include program code enabled to determine if storing a new publication in connection with a topically related one of the durable subscriptions for a subscribing end user disconnected from the messaging system causes a quantity of publications stored in connection with the durable subscription to exceed a pre-determined maximum quantity. The program code also can be enabled to store the new publication in connection with the durable subscription. Finally, the program code can be enabled to remove an oldest publication stored in connection with the durable subscription when it is determined that storing the new publication in connection with the durable subscription causes a quantity of publications stored in connection with the durable subscription to exceed the maximum quantity.

In yet another embodiment of the invention, a computer program product for managing the backlog of undelivered publications for durable subscriptions can be provided. The computer program product can include a computer readable storage medium having computer readable program code embodied therewith. The computer readable program code can include computer readable program code for establishing a maximum quantity of publications stored in connection with a durable subscription to publications of a particular topic on behalf of a particular subscribing end user. The computer readable program code also can include computer readable program code for receiving a new publication published for the particular topic subscribed to by the end user. The computer readable program code even further can include computer readable program code for determining if storing the new publication in connection with the durable subscription causes a quantity of publications stored in connection with the durable subscription to exceed the maximum quantity. The computer readable program code even yet further can include computer readable program code for storing the new publication in connection with the durable subscription. Finally, the computer readable program code can include computer readable program code for removing an oldest publication stored in connection with the durable subscription when it is determined that storing the new publication in connection with the durable subscription causes a quantity of publications stored in connection with the durable subscription to exceed the maximum quantity.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for managing the backlog of undelivered publications for durable subscriptions;

FIG. 2 is a schematic illustration of a messaging data processing system configured for managing the backlog of undelivered publications for durable subscriptions; and, FIG. 3 is a method for managing the backlog of undelivered publications for durable subscriptions.

DETAILED DESCRIPTION

Embodiments of the invention provide for a method, system and computer program product for managing the backlog of undelivered publications for durable subscriptions. In an embodiment of the invention, different durable subscriptions can be established in a messaging system for different topics on behalf of different subscribing end users. Each durable subscription can be characterized by a maximum number of publications stored on behalf of a corresponding one of the different subscribing end users while the corresponding one of the different subscribing end users remains disconnected from the messaging system. As a new publication becomes available for a durable subscription for a specific topic in which the maximum quantity of publications have been stored, an oldest publication stored in the durable subscription can be discarded in favor of the new publication. In this way, when a subscribing end user to the durable subscription connects with the messaging system, a limited number of temporally relevant publications for the topic will be available for viewing by the subscribing end user without overburdening the subscribing end user with a tremendous volume of stored publications for the specific topic.

In further illustration, FIG. 1 is a pictorial illustration of a process for managing the backlog of undelivered publications for durable subscriptions. As shown in FIG. 1, multiple different durable subscriptions 120A, 120B, 120N, each for a different topic, can be established for a subscribing end user 110 in a messaging system. Each of the durable subscriptions 120A, 120B, 120N can include a pre-determined maximum quantity of publications able to be stored in association with the subscribing end user 110 while the subscribing end user 110 remains disconnected from the messaging system. For a given durable subscription 120A amongst the durable subscriptions 120A, 120B, 120N, as a newly published publication 130A becomes available, the newly published publication 130A can be stored in association with the given durable subscription 120A.

To the extent that the addition of the newly published publication 130A to the given durable subscription 120A results in a quantity of publications 130A, 130B, 130C, 130N that exceed the permitted maximum quantity of publications for the given durable subscription 120A, the temporally oldest publication 130N in the given durable subscription 120A can be removed from the given durable subscription 120A. Once the subscribing end user 110 connects to the messaging system and reviews in order of the oldest to most recent, the publications 130C, 130B, 130A remaining for the given durable subscription, the publications 130C, 130B, 130A can be removed from the given durable subscription and the process can repeat as the subscribing end user 110 disconnects from the messaging system.

The process described in connection with FIG. 1 can be implemented in a messaging data processing system. In further illustration, FIG. 2 is a schematic illustration of a messaging data processing system configured for managing the backlog of undelivered publications for durable subscriptions. The system can include a host messaging server 210 with processor and memory providing messaging services as part of a messaging system to end users over computer communications network 220.

The host messaging server 210 can be coupled to multiple different clients 230, each executing a content browser 240 through which the end users can access the messaging services of the messaging system in the messaging server 210. The host messaging server 210 further can be coupled to multiple different content providers 250 providing publications 260 pertaining to different topics. In this regard, end users accessing the messaging services of the host messaging server 210 through respective ones of the content browsers 240 can subscribe to different topics in the messaging system so that upon connecting to the messaging system, the end users can receive ones topically relevant ones of the publications 260 published by the content providers 250 and stored in the messaging system when the end users are not connected to the messaging system.

Of note, fixed size durable subscription module 300 can be coupled to the messaging server 210 and can execute in the memory by the processor of the messaging server 210. The module 300 can include program code enabled to establish a maximum quantity of the publications 260 published by the content providers 250 for a topic as part of a durable subscription for the end user while the end user is disconnected from the messaging server 210 to be stored pending connection and review of the publications by the end user. The program code of the module 300 further can be enabled to discard a temporally oldest stored publication in the durable subscription in favor of a newest publication published for the topic for the end user and to be added to the durable subscription when the quantity of publications stored for the end user exceeds the maximum quantity. In this way, the backlog of publications in the durable subscription can be managed efficiently in a temporally relevant manner.

In even yet further illustration of the operation of the program code of the module 300, FIG. 3 is a method for managing the backlog of undelivered publications for durable subscriptions. Beginning in block 310, a new publication can be published for a topic in a durable subscription for an end user. In block 320, the topic of the new publication can be determined and in block 330, a subscriber to the topic associated with the durable subscription can be determined. In block 340, a maximum quantity of publications stored for the durable subscription can be retrieved and in block 350, a number of publications already stored for the durable subscription can be determined.

In decision block 360, it can be determined if the number of publications stored in connection with the durable subscription will exceed the maximum quantity with the addition of the new publication. If not, in block 380, the new publication can be stored in connection with the durable subscription without removing any other publications already stored in connection with the durable subscription. Otherwise, if so, in block 370 the oldest publication already stored in connection with the durable subscription can be removed and in block 380, the new publication can be stored in connection with the durable subscription.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for managing the backlog of undelivered publications for durable subscriptions, the method comprising:

connecting a client computer of a subscriber to a messaging system so as to define a period of activity of the subscriber;

during the connection and period of activity, presenting for review in order of oldest to most recent in a user interface of the client computer, publications remaining for a durable subscription of the subscriber and then removing the reviewed publications from the durable subscription, and retrieving while the subscriber is connected to the messaging system, a maximum quantity of publications able to be stored for a particular topic for subscriber when the subscriber remains disconnected from the messaging system during a period of inactivity of the subscriber;

once the maximum quantity of publications have been received while the client computer of the subscriber is connected to the messaging system, disconnecting the client computer of the subscriber from the messaging system so as to define a period of inactivity of the subscriber while the client computer of the subscriber remains disconnected from the messaging system; and, during the disconnection and period of inactivity of the subscriber, receiving in the messaging system a new publication published for the particular topic subscribed to by the subscriber, determining whether or not adding the new publication to the subscription of the subscriber while the subscriber remains disconnected from the messaging system causes a quantity of publications in the subscription while the subscriber remains disconnected from the messaging system during the period of inactivity to exceed the maximum quantity of publications able to be stored for a particular topic for the subscriber when the subscriber remains disconnected from the messaging system during the period of inactivity of the subscriber; and, adding the new publication to the subscription of the subscriber while the subscriber is disconnected from the messaging system during the period of inactivity only if the addition of the new publication does not cause the quantity of publications in the subscription of the subscriber to exceed the maximum quantity of publications able to be stored for a particular topic for the subscriber when the subscriber remains disconnected from the messaging system during the period of inactivity of the subscriber, but otherwise removing from the subscription of the subscriber an oldest stored publication and then adding the new publication to the subscription.

2. The method of claim 1, further comprising removing all publications from storage in the client computer responsive to the connection of the subscriber to the messaging system.

3. The method of claim 1, wherein receiving in the messaging system the new publication published for the particular topic subscribed to by the particular subscribing end user, comprises determining a topic of the new publication and further determining a subscriber to the topic.

4. A messaging data processing system configured for managing the backlog of undelivered publications for durable subscriptions, the system comprising:

a messaging server comprising a processor and a memory and configured for coupling to a plurality of content providers over a computer communications network;

a messaging system executing in the memory of the messaging server and configured to manage different durable subscriptions on behalf of correspondingly different subscribing end users accessing the messaging system; and, a fixed size durable subscription module executing in the memory of the messaging server and also coupled to the messaging system, the fixed size durable subscription module comprising program code that when executed causes the processor of the messaging server:

to connect a client computer of a subscriber to a messaging system so as to define a period of activity of the subscriber and during the connection and period of activity, to present for review in order of oldest to most recent in a user interface of the client computer, publications remaining for a durable subscription of the subscriber and then removing the reviewed publications from the durable subscription and to retrieve while the subscriber is connected to the messaging system a predetermined maximum quantity of publications able to be stored for a topic for a subscriber when the subscriber remains disconnected from the messaging system during a period of inactivity of the subscriber;

once the maximum quantity of publications have been received while the client computer of the subscriber is connected to the messaging system, to disconnect the client computer of the subscriber from the messaging system so as to define a period of inactivity of the subscriber; and, during the disconnection and period of inactivity of the subscriber, to determine whether or not adding a new publication corresponding to the topic to the subscription of the subscriber while the subscriber remains disconnected from the messaging system causes a quantity of publications in the subscription while the subscriber remains disconnected from the messaging system during the period of inactivity to exceed the retrieved pre-determined maximum quantity of publications able to be stored for a particular topic for the subscriber when the subscriber remains disconnected from the messaging system during the period of inactivity of the subscriber and to add the new publication to the subscription of the subscriber while the subscriber remains disconnected from the messaging system during the period of inactivity only if the addition of the new publication does not cause the quantity of publications in the subscription of the subscriber to exceed the retrieved maximum quantity of publications able to be stored for a particular topic for the subscriber when the subscriber remains disconnected from the messaging system during the period of inactivity of the subscriber, but otherwise removing from the subscription of the subscriber an oldest stored publication and then adding the new publication to the subscription.

5. The system of claim 4, wherein the program code is further enabled to remove all publications from storage in the client computer responsive to the connection of the subscriber to the messaging system.

6. A computer program product for managing the backlog of undelivered publications for durable subscriptions, the computer program product comprising:

a non-transitory computer readable storage medium having computer readable program code embodied therewith, the computer readable program code comprising:

computer readable program code for connecting a client computer of a subscriber to a messaging system so as to define a period of activity of the subscriber and during the connection and period of activity, presenting for review in order of oldest to most recent in a user interface of the client computer, publications remaining for a durable subscription of the subscriber and then removing the reviewed publications from the durable subscription and computer readable program code for retrieving while the subscriber is connected to the messaging system, a maximum quantity of publications able to be stored for a particular topic for subscriber when the subscriber remains disconnected from the messaging system during a period of inactivity of the subscriber;

computer readable program code for, once the maximum quantity of publications have been received while the client computer of the subscriber is connected to the messaging system, disconnecting the client computer of the subscriber from the messaging system so as to define a period of inactivity of the subscriber while the client computer of the subscriber remains disconnected from the messaging system; and, computer readable program code for during the disconnection and period of inactivity of the subscriber, computer readable program code for receiving in the messaging system a new publication published for the particular topic subscribed to by the subscriber;

computer readable program code for determining whether or not adding the new publication to the subscription of the subscriber while the subscriber remains disconnected from the messaging system causes a quantity of publications in the subscription while the subscriber remains disconnected from the messaging system during the period of inactivity to exceed the retrieved maximum quantity of publications able to be stored for a particular topic for the subscriber when the subscriber remains disconnected from the messaging system during the period of inactivity of the subscriber and, computer readable program code for adding the new publication to the subscription of the subscriber while the subscriber is disconnected from the messaging system during the period of inactivity only if the addition of the new publication does not cause the quantity of publications in the subscription of the subscriber to exceed the retrieved maximum quantity of publications able to be stored for the particular topic for the subscriber when the subscriber remains disconnected from the messaging system during the period of inactivity of the subscriber, but otherwise removing from the subscription of the subscriber an oldest stored publication.

7. The computer program product of claim 6, further comprising computer readable program code for removing all publications from storage in the client computer responsive to the connection of the subscriber to the messaging system.

8. The computer program product of claim 6, wherein the computer readable program code for receiving the new publication published for the particular topic subscribed to by the particular subscribing end user, comprises computer readable program code for determining a topic of the new publication and further determining a subscriber to the topic.

* * * * *